July 16, 1963
B. J. NEWBURY
3,097,892
PIPE GUIDE
Filed Aug. 2, 1961
3 Sheets-Sheet 1
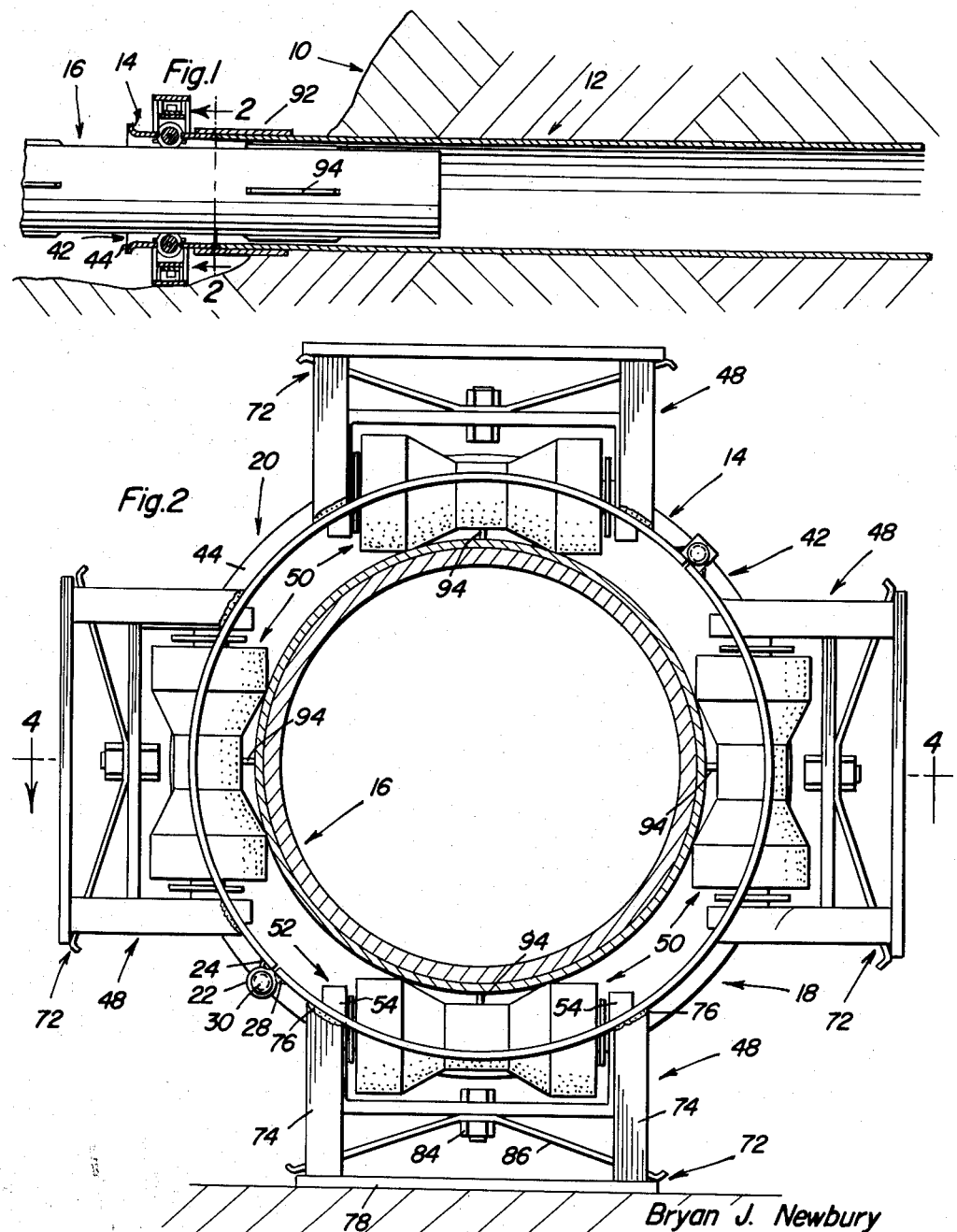
Bryan J. Newbury
INVENTOR.
BY *Clarence A. O'Brien*
*and Harvey B. Jacobson*
Attorneys

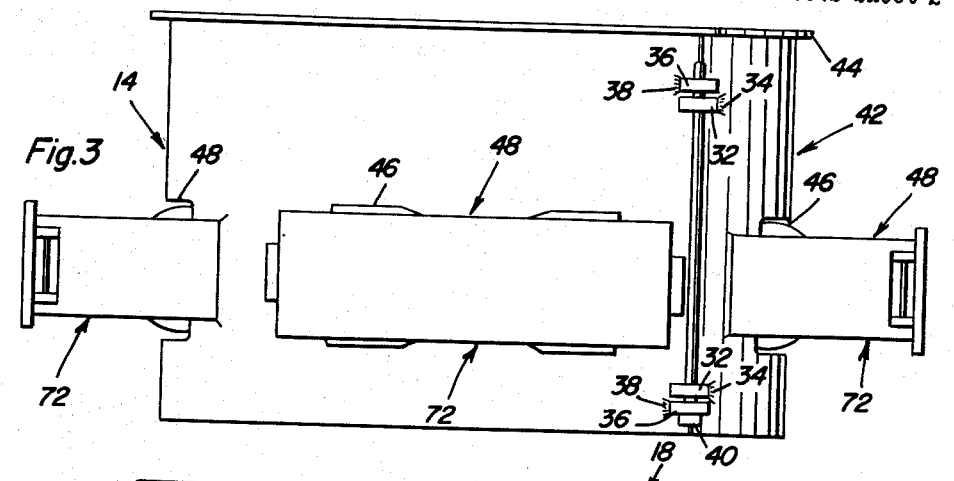
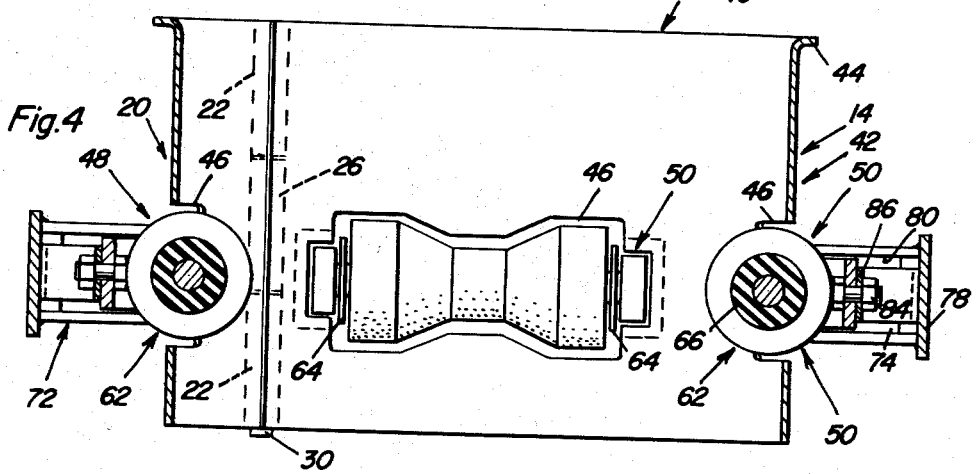
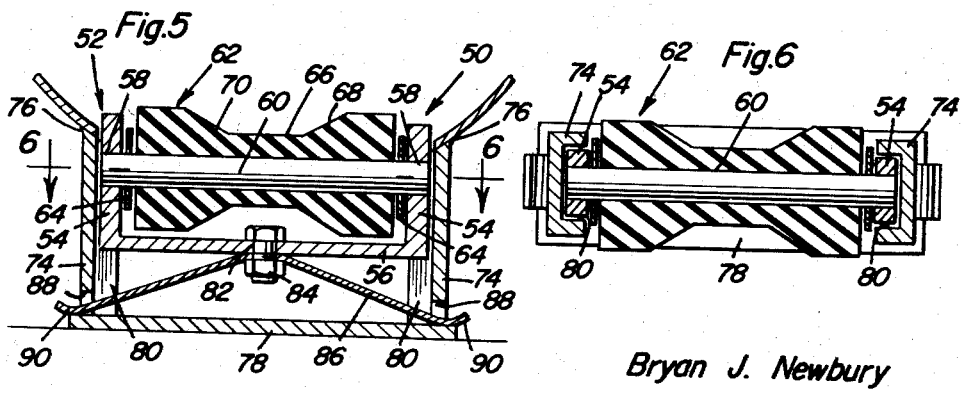

July 16, 1963     B. J. NEWBURY     3,097,892
PIPE GUIDE
Filed Aug. 2, 1961     3 Sheets-Sheet 3
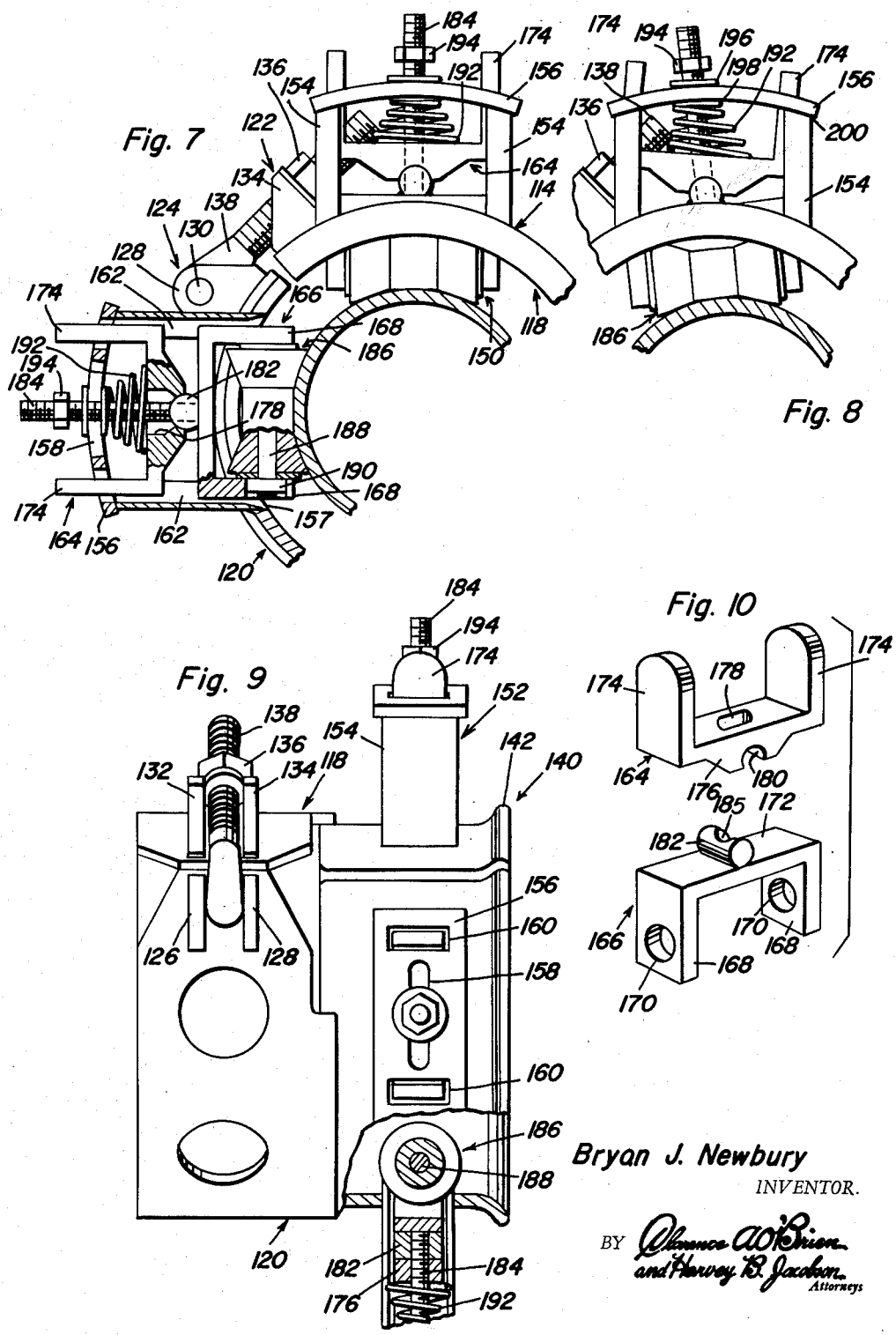
Bryan J. Newbury
INVENTOR.
BY *Clarence A. O'Brien*
*and Harvey B. Jackson*
Attorneys United States Patent Office 3,097,892
Patented July 16, 1963

3,097,892
PIPE GUIDE
Bryan J. Newbury, 2700 Riggan, Corpus Christi, Tex.
Filed Aug. 2, 1961, Ser. No. 129,212
5 Claims. (Cl. 308—6)

This is a continuation-in-part application of my copending application U.S. Serial No. 71,088, filed November 22, 1960, which was abandoned on August 2, 1961, and the instant invention relates to a novel and useful pipe guide and more particularly to a pipe guide specifically adapted to guide the insertion of a pipe within a permanently mounted casing.

In the construction of pipelines under road crossings it is required that the pipeline be cased within a larger size pipe or conduit. Usually, all permanent pipelines are coated with a protective substance (plastic tape or a hot enamel preparation wrapped with a treated felt material) and in most instances the section of pipe to be inserted in the conduit is equipped with longitudinally extending and radially projecting pipe spacer ribs which may be constructed either of plastic, rubber, or other insulating materials. These spacers are to protect the coating applied about the outer surfaces of the pipe being inserted into the casing and to insure a clearance between the pipe and the casing. The pipe guide of the instant invention has two purposes. First, it eliminates the hazard of damage to the coating on the outer surfaces of the pipe being inserted in the conduit and secondly, it will greatly facilitate the insertion of the pipe into the conduit and reduce the time normally required for this process by a considerable amount.

The pipe guide of the instant invention includes a cylindrical mounting member adapted at one end to be secured to an end of a casing in axial alinement therewith. The other end of the cylindrical member is flared and the cylindrical member is provided with a plurality of circumferentially spaced guide means projecting inwardly of the inner surfaces thereof adapted to embracingly and guidingly engage the outer surfaces of a pipe being slid therebetween and into the casing whereby the pipe being inserted in the casing may be maintained in spaced relation relative to the casing.

The main object of this invention is to provide a pipe guide which will guidingly engage the outer surfaces of a pipe being inserted into an outer casing member adjacent one end of the outer casing member whereby the pipe being inserted into the casing may be maintained in spaced relation relative to the internal surfaces of the casing.

A further object of this invention is to provide guide means for the pipe guide circumferentially spaced thereabout which will resiliently engage the outer surfaces of the pipe being inserted into the casing whereby the protective substance applied to the outer surfaces of the pipe will not be allowed to come in contact with the hard inner surfaces of the casing.

Still another object of this invention, in accordance with the preceding object is to provide a pipe guide adapted to guide the movement of a section of pipe within an outer casing member with the pipe guide being constructed in a manner whereby it may be disposed about the pipe without being passed over a free end of the pipe.

Another object of this invention is to provide a pipe guide in accordance with the preceding objects which may be readily clampingly engaged with the end of a casing section into which a length of pipe is to be guided in order to mount the pipe guide on the casing section in substantial longitudinal alignment therewith.

Yet another object of this invention is to provide a pipe guide which may be readily clampingly secured to casing sections of various sizes.

A still further object of this invention is to provide a pipe guide in accordance with the preceding objects constructed in a manner whereby the guide will be adapted to guidingly support pipe sections of various diameters being inserted into a casing section.

A final object of this invention is to provide a pipe guide which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical sectional view illustrating a section of an outer casing passing beneath a road crossing with the pipe guide being mounted on one end of the casing by means of a pair of pipeline line-up clamps and the pipe guide being utilized to guide the movement of a section of pipe within the casing;

FIGURE 2 is an enlarged vertical transverse sectional view taken substantially upon the plane indicated by the section line 2—2 of FIGURE 1 with the line-up clamps removed;

FIGURE 3 is a top plan view of the pipe guide;

FIGURE 4 is a horizontal longitudinal sectional view taken substantially upon the plane indicated by the section line 4—4 of FIGURE 2;

FIGURE 5 is a transverse sectional view passing substantially through the center of one of the roller assemblies of the pipe guide;

FIGURE 6 is a transverse sectional view taken substantially upon the plane indicated by the section line 6—6 of FIGURE 5;

FIGURE 7 is a sectional view similar to that of FIGURE 2 but on somewhat of a reduced scale and of a modified form of pipe guide with portions thereof being broken away and shown in section;

FIGURE 8 is a fragmentary sectional view similar to that of FIGURE 7 showing the manner in which the pipe guide may be secured to a casing section of larger diameter than that illustrated in FIGURE 7 and the manner in which the roller guide means carried by the modified form of pipe guide are mounted in order to conform to pipe sections of various sizes being inserted into the casing section to which the pipe guide is secured;

FIGURE 9 is a fragmentary top plan view of the modified form of pipe guide with parts thereof being broken away and shown in section; and FIGURE 10 is an exploded perspective view of one of the carriage members utilized to resiliently mount a guide roller of the modified form of pipe guide.

Referring now more specifically to the drawings, the numeral 10 generally designates a portion of a road crossing under which a section of casing generally designated by the reference numeral 12 passes. The pipe guide of the instant invention is generally designated by the reference numeral 14 and is shown in FIGURE 1 of the drawings being utilized to embracingly and guidingly engage the end of a pipe section generally referred to by the reference numeral 16 being inserted into the end of the casing 12.

With attention now directed more particularly to FIGURES 2–4 of the drawings it will be noted that the pipe guide 14 includes a pair of arcuate sections generally designated by the reference numerals 18 and 20 which each comprise a substantially semi-circular member. Along one longitudinal edge of the arcuate section 20 a pair of alined and longitudinally spaced cylindrical members 22 are secured in any convenient manner such as by welding 24. Secured to the adjacent longitudinal edge of the section 18 is a cylindrical member 26 which is secured thereto in any convenient manner such as by welding 28. When the adjacent longitudinal edges of the sections 18 and 20 are disposed in butting relation the cylindrical members 22 and 26 are alined to receive therethrough a hinge pin 30 whereby the sections 18 and 20 are pivotally secured together. The other longitudinal edge of the section 18 has a pair of nuts 32 secured thereto by means of welding 34 and the adjacent longitudinal edge of the section 20 has a pair of nuts 36 secured thereto by means of welding 28. When the adjacent longitudinal edges of the sections 18 and 20 are disposed in abutting relation, the nuts 32 and 36 are alined to receive therethrough a bolt or pin 40 for securing the sections 18 and 20 together to form an integral cylindrical member generally referred to by the reference numeral 42.

One end of the cylindrical member 42 is flared as at 44 for facilitating the insertion of a pipe section thereinto and the sections 18 and 20 of the cylindrical member 42 are each provided with a pair of circumferential slots 46. The cylindrical member 42 is provided with a plurality of circumferentially spaced guide means generally designated by the reference numeral 48 adapted to embracingly and guidingly engage the outer surfaces of the pipe section 16 being slid therebetween and into the casing 12 to which the pipe guide 14 is secured. Each of the guide means 48 includes a roller assembly generally referred to by the reference numeral 50.

With attention now directed to FIGURES 5 and 6 of the drawings it will be noted that each of the roller assemblies 50 includes a generally U-shaped carriage member generally referred to by the reference numeral 52 having a pair of parallel legs 54 interconnected by means of a bight portion 56. The legs 54 are apertured as at 58 and rotatably journal an axle member 60 on which there is disposed a resilient roller generally referred to by the reference numeral 62. Suitable washers 64 are disposed between the remote ends of the roller 62 and the adjacent surfaces of the legs 54.

Each of the rollers 62 includes a diametrically reduced portion 66 intermediate its opposite ends defined by two truncated cone-shaped and oppositely tapering shoulder portions 68 and 70.

Mounting means generally referred to by the reference numeral 72 are provided for mounting the roller assemblies 50 for radial movement of the cylindrical member 42 and for resiliently urging the roller assemblies 50 inwardly of the cylindrical member 42. The mounting means 72 each includes a pair of transversely spaced and outwardly projecting mounting lugs 74 which are secured to the cylindrical member 42 at their inner ends in any convenient manner such as by welding 76. The mounting lugs 74 are disposed on parallel chords of the cylindrical member 42 on opposite sides of the longitudinal axis thereof. The outer ends of the mounting lugs 74 are interconnected by means of an end member 78 and the confronting surfaces of the mounting lugs 74 have longitudinally extending recesses 80 formed therein which slidingly and embracingly engage the legs 54 of the corresponding roller assembly 50. As can best be seen in FIGURE 5 of the drawings the bight portion 56 is apertured as at 82 and has secured thereto by means of a fastener 84 a leaf spring 86. It will be noted that the leaf spring 86 is disposed between the confronting surfaces of the end member 78 and the associated bight portion 56 whereby the leaf spring 86 will normally resiliently urge the associated roller assembly 50 inwardly of the cylindrical member 42.

The outer ends of the mounting lugs 74 are each provided with a slot 88 for receiving the curved end portions 90 of the leaf spring 86.

It will be noted from FIGURE 4 of the drawings that the circumferentially extending slots 46 conform to the general plan outline of the roller members 62 and that the axes of rotation of the roller shafts 60 are substantially tangential to the cylindrical member 42.

In operation, the pipe guide 14 is secured to the outer end of a casing such as that illustrated at 12 by means of a pair of pipeline line-up clamps 92 in axial alinement with the casing 12. The pipe section 16 is then inserted in the flared end of the cylindrical member 42 with the longitudinally extending and radially projecting pipe spacer ribs 94 alined with the diametric reduced portions 66 of the rollers 62. The pipe section 16 may then be inserted into the casing 12 without the outer surfaces of the pipe section 16 coming in contact with the inner surfaces of the casing 12.

With attention now invited to FIGURES 7–10 of the drawings it will be seen that a modified form of pipe guide is generally designated by the reference numeral 114. The pipe guide 114 includes a pair of arcuate sections generally designated by the reference numerals 118 and 120 which each comprises a substantially semi-circular member as do the sections 18 and 20. One pair of adjacent ends of the arcuate sections 118 and 120 are pivotally secured together in the same manner in which the corresponding ends of the sections 18 and 20 are secured together by means of hinge pin 30. The other pair of adjacent ends of the sections 118 and 120 are secured together for adjustable positioning toward and away from each other by means of a pair of bifurcated mounts generally referred to by the reference numerals 122 and 124 which are secured to the sections 118 and 120 respectively. One end of a threaded shank is pivotally secured between the furcations 126 and 128 of the bifurcated mount 124 by means of pivot pin 130. The end faces of the furcations 132 and 134 remote from the furcations 126 and 128 comprise abutment surfaces for coaction with the threaded fastener 136 threadedly engaged with the free end of the threaded shank 138. In this manner, it may be seen that the threaded shank 138 and the threaded fastener 136 may be utilized to urge the ends of the sections 118 and 120 remote from their pivotal connection with each other together in order that the sections 118 and 120 may clampingly engage the end of a casing section into which a pipe section is to be placed.

The forward end of the substantially cylindrical member generally referred to by the reference numeral 140 which is formed by the semi-circular arcuate sections 118 and 120 is outwardly flared as at 142.

A plurality of generally U-shaped carriage members referred to in general by the reference numerals 152 are utilized to yieldably mount a plurality of roller assemblies 150 for radial movement relative to the cylindrical member 140 defined by the sections 118 and 120. Each of the carriage members 152 includes a pair of generally parallel legs 154 which are interconnected at their outer ends by means of a bight portion 156. It will be noted that the ends of the legs 154 remote from the corresponding bight portion 156 are fixedly secured within a corresponding opening or slot 157 formed in the corresponding semi-circular section. Each bight portion 156 is longitudinally curved and is bowed outwardly between the corresponding legs 154. Each bight position 156 includes a longitudinally extending slot 158 and a pair of longitudinally spaced and transversely elongated openings 160. In addition, it will be noted that the legs 154 are each generally U-shaped in cross section and that each pair of legs 154 defines a pair of opposing channels 162.

Each roller assembly 150 includes a pair of carriage slide members generally referred to by the reference numerals 164 and 166. Each of the carriage slide members 166 includes a pair of generally parallel legs 168 which are apertured as at 170 and interconnected at their outer ends by means of a bight portion 172. The carriage slide members 164 each include a pair of generally parallel legs 174 interconnected at their inner ends by means of a bight portion 176 which is provided with a longitudinally extending slot 178.

The bight portion 176 defines a transversely extending semi-circular groove 180 which opens outwardly from the bight portion 176 in a direction away from the direction in which the legs 174 extend. The side of the bight portion 172 remote from the legs 168 is provided with a transversely extending rod section 182 which is fixedly secured to the bight portion 172 in any convenient manner and projects from the side face thereof remote from the legs 168. The rod portion 182 is snugly received within the groove 180 and rockably mounts the slide member 164 on the slide member 166.

An externally threaded shank portion 184 has one end threadedly engaged in a threaded blind bore 185 formed in each rod portion 182 and the shank portion 184 projects through the associated slot 178 and the corresponding slot 158 formed in the associated bight portion 156.

A roller 186 is journalled for rotation between the free ends of each pair of legs 168 by means of an axle member 188 whose opposite ends are rotatably journalled in suitable bearing assemblies 190 secured in corresponding apertures 170.

A compression spring 192 is disposed about each of the externally threaded shank portions 184 and between the bight portions 176 and 156. The end of each shank portion 184 remote from the corresponding bight portion 172 projects through the corresponding elongated slot 158 and a threaded fastener 194 is threadedly engaged therewith and may be utilized to retract the corresponding roller 186 by manipulating the fastener 194 on its corresponding shank portion 184 into engagement with the associated bight portion 156 in order to move the corresponding roller 186 radially outwardly and to establish an innermost limit position of radial movement of each of the rollers 186. A suitable washer 196 may be disposed about the shank portion 184 and between the fastener 194 and the bight portion 156 and a similar washer 198 may be disposed between the outer end of each spring 192 and the corresponding bight portion 156. It will be noted that each bight portion 156 is secured to its corresponding legs 154 in any convenient manner such as by welding 200 and that the legs and opposite ends of the bight portions of each slide member 164 and 166 are slidingly received in the channels 162 defined by each pair of legs 154. However, the slide members 164 and 166 are loosely received in the channels 162 and the slide members 164 and 166 may be cocked as illustrated in FIGURE 8 of the drawings when the pipe guide 14 is used in connection with a casing section or pipe of a diameter other than that which will enable the sections 118 and 120 to be clampingly disposed about a casing section with the sections 118 and 120 defining a circle and with the roller assemblies substantially radially alined with the pipe section being guided as illustrated in FIGURE 7 of the drawings.

The operation of the pipe guide 114 is substantially identical with the operation of the pipe guide 14 except that the pipe guide 114 may be clampingly engaged about a casing section and is constructed in a manner whereby the roller assemblies 150 will still be capable of offering nonfriction guiding support for a pipe section being inserted into a casing section of somewhat larger diameter than the cylindrical member 140 when the adjacent ends of the sections 118 and 120 are disposed in end abutting relation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pipe guide for centering a pipe with respect to a casing into which a pipe is to be inserted, said pipe guide comprising an open frame-like member including means adapting one end for securement to one end of a casing in axial alinement therewith, pipe guide means spaced about said frame-like member and projecting inwardly of the inner surfaces thereof adapted to embracingly and guidingly engage the outer surfaces of a pipe being slid therebetween and into said casing and to maintain the adjacent surfaces of said pipe in spaced relation from the inner surfaces of said casing, said pipe guide means each including a roller, means mounting each of said rollers for movement about an axis extending transversely of the longitudinal axis of said frame-like member, said frame-like member being cylindrical, each of said mounting means including a pair of transversely spaced and outwardly projecting mounting lugs carried by said frame-like member disposed on parallel chords thereof, a generally U-shaped carriage member having a pair of legs interconnected by a bight portion, said carriage opening inwardly of said cylindrical member and disposed between said mounting lugs with said legs generally paralleling said lugs, means on said lugs slidably guiding said carriage for radial movement therebetween, said roller journalled for rotation between the confronting surfaces of said legs, and means connected between said carriage and said cylindrical member resiliently urging the former inwardly and radially of said cylindrical member.

2. The combination of claim 1, including an end member interconnecting the outer ends of each pair of mounting lugs, said resilient means being disposed between the confronting surfaces of each of said end members and the corresponding bight portion of said carriage.

3. The combination of claim 2, wherein said guide means on said lugs comprise longitudinally extending confronting recesses formed in each pair of lugs slidably receiving the remote portions of the corresponding legs.

4. A pipe guide for centering a pipe with respect to a casing into which a pipe is to be inserted, said pipe guide comprising an open frame-like member including means adapting one end for clamping engagement with one end of a casing in axial alinement therewith, pipe guide means spaced about said frame-like member and projecting inwardly of the inner surfaces thereof adapted to embracingly and guidingly engage the outer surfaces of a pipe being slid therebetween and into said casing and to maintain the adjacent surfaces of said pipe in spaced relation from the inner surfaces of said casing, said pipe guide means each including a roller and means mounting said roller for rotation about an axis extending transversely of the longitudinal axis of said frame-like member, said mounting means also including means mounting each of said rollers for movement about an axis generally paralleling the longitudinal axis of said frame-like member, said frame-like member being cylindrical and including a pair of semi-circular sections, means pivotally securing two adjacent edges of said sections together, means removably and adjustably securing the other two adjacent edges together, each of said mounting means including a pair of transversely spaced and outwardly projecting mounting lugs carried by said frame-like member disposed on coplanar chords thereof, an end member interconnecting the outer ends of each pair of mounting lugs, a longitudinally extending slot in said end member, a first generally U-shaped carriage member having a pair of legs interconnected by a bight portion, said carriage opening inwardly of said cylindrical member and loosely disposed between said mounting lugs with said legs generally paralleling said lugs, a transversely extending rod section secured to the bight portion on the face remote from the legs, a second generally U-shaped carriage member having a pair of legs interconnected by a bight portion, a semi-circular groove opening outwardly from said second member bight portion on the face remote from the legs, said second member being rockably mounted on said first carriage member with the transverse rod received within the groove, an elongated slot through the bight portion of the second member and in communication with the transverse rod, a shank portion secured to said transverse rod and extending through the slot in said second member and through the slot in said end member, adjustable clamp means on the outer free end of the shank portion preventing movement of the carriage members toward said cylindrical member but allowing movement away from said cylindrical member either perpendicularly or at an angle thereto, and resilient means positioned between the end member and the second carriage member bight portion biasing said carriage members away from the end member toward said cylindrical member, said roller journaled for rotation between the confronting surfaces of the legs of the first carriage member.

5. A pipe guide for centering a pipe, said pipe guide comprising an open frame-like member, pipe guide means spaced about said frame-like member and projecting inwardly of the inner surfaces thereof adapted to embracingly and guidingly engage the outer surfaces of a pipe being slid therebetween, said pipe guide means each including a roller, means mounting each of said rollers for movement about an axis extending transversely of the longitudinal axis of said frame-like member, each of said mounting means including a pair of transversely spaced parallel generally radially extending mounting lugs carried by said frame-like member, a carriage member, said carriage opening inwardly of said cylindrical member and being slidably disposed between said mounting lugs, means on said lugs slidably guiding said carriage for radial movement therebetween, said roller journaled for rotation within the carriage, and means connected between said carriage and said frame-like member resiliently urging the former inwardly and radially of said cylindrical member, said guide means on said lugs comprising longitudinally extending confronting recesses formed in each pair of lugs slidably receiving the remote portions of the carriage.

References Cited in the file of this patent

UNITED STATES PATENTS

| | | |
|---|---|---|
| 813,588 | Rollins | Feb. 27, 1906 |
| 2,522,695 | Walter | Sept. 19, 1950 |
| 2,620,239 | Gruenais | Dec. 2, 1952 |
| 2,795,111 | Richardson | June 11, 1957 |
| 2,816,734 | Crofoot | Dec. 17, 1957 |
| 2,928,701 | Ferdig | Mar. 15, 1960 |

FOREIGN PATENTS

| | | |
|---|---|---|
| 56,516 | Norway | May 4, 1956 |
| 1,156,475 | France | Dec. 16, 1957 |